(12) United States Patent
Shekhar et al.

(10) Patent No.: US 10,311,913 B1
(45) Date of Patent: Jun. 4, 2019

(54) SUMMARIZING VIDEO CONTENT BASED ON MEMORABILITY OF THE VIDEO CONTENT

(71) Applicant: Adobe Inc., San Jose, CA (US)

(72) Inventors: Sumit Shekhar, Bangalore (IN); Harvineet Singh, Karnataka (IN); Dhruv Singal, Karnataka (IN); Atanu R. Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/902,046

(22) Filed: Feb. 22, 2018

(51) Int. Cl.
*G11B 27/031* (2006.01)
*G06K 9/00* (2006.01)
*G06K 9/62* (2006.01)

(52) U.S. Cl.
CPC ........ *G11B 27/031* (2013.01); *G06K 9/00718* (2013.01); *G06K 9/00751* (2013.01); *G06K 9/00765* (2013.01); *G06K 9/623* (2013.01)

(58) Field of Classification Search
CPC ............. G11B 27/031; G06K 9/00718; G06K 9/00751; G06K 9/00765; G06K 9/623
See application file for complete search history.

(56) References Cited

U.S. PATENT DOCUMENTS

| | | | |
|---|---|---|---|
| 6,535,639 B1 * | 3/2003 | Uchihachi | G06F 17/30799 341/79 |
| 7,751,592 B1 | 7/2010 | Rosenberg | |
| 7,856,435 B2 * | 12/2010 | Nanavati | G06F 17/30637 707/722 |
| 8,165,414 B1 | 4/2012 | Yagnik | |
| 8,392,450 B2 | 3/2013 | Blanchflower | |
| 8,620,139 B2 | 12/2013 | Li | |
| 9,589,190 B2 * | 3/2017 | Ramakrishnan | G06K 9/00771 |
| 9,721,165 B1 | 8/2017 | Van Tuyl | |
| 9,805,269 B2 | 10/2017 | Shekhar et al. | |
| 10,129,573 B1 | 11/2018 | Sahasrabudhe et al. | |
| 2010/0104261 A1 * | 4/2010 | Liu | G11B 27/034 386/241 |
| 2013/0129316 A1 | 5/2013 | Dontcheva | |
| 2014/0003652 A1 | 1/2014 | Federovskaya | |
| 2014/0156651 A1 * | 6/2014 | Rayter | H04N 21/8549 707/723 |
| 2014/0219563 A1 | 8/2014 | Rodriquez-Serrano | |

(Continued)

OTHER PUBLICATIONS

Gygli, Michael, et al., Video Summarization by Learning Submodular Mixtures of Objectives, In IEEE Conference on Computer Vision and Pattern Recognition, Jun. 2015, 9 pages.

(Continued)

*Primary Examiner* — Gelek W Topgyal
(74) *Attorney, Agent, or Firm* — Kilpatrick Townsend & Stockton LLP

(57) ABSTRACT

Certain embodiments involve generating summarized versions of video content based on memorability of the video content. For example, a video summarization system accesses segments of an input video. The video summarization system identifies memorability scores for the respective segments. The video summarization system selects a subset of segments from the segments based on each computed memorability score in the subset having a threshold memorability score. The video summarization system generates visual summary content from the subset of the segments.

17 Claims, 7 Drawing Sheets

(56) References Cited

U.S. PATENT DOCUMENTS

| | | | |
|---|---|---|---|
| 2014/0245152 A1 | 8/2014 | Carter | |
| 2014/0255249 A1 | 9/2014 | Abe et al. | |
| 2014/0307962 A1 | 10/2014 | Seikh | |
| 2015/0036947 A1 | 2/2015 | Datar | |
| 2015/0055854 A1 | 2/2015 | Marchesotti | |
| 2015/0169977 A1 | 6/2015 | Corpet | |
| 2015/0243325 A1 | 8/2015 | Pacurariu | |
| 2015/0269191 A1 | 9/2015 | Duan | |
| 2015/0363688 A1 | 12/2015 | Jianfeng | |
| 2016/0014482 A1* | 1/2016 | Chen | G11B 27/031 386/241 |
| 2016/0092561 A1* | 3/2016 | Liu | G06F 17/30843 386/230 |
| 2016/0133297 A1* | 5/2016 | Thornton | G11B 27/06 386/230 |
| 2017/0147906 A1 | 5/2017 | Shekhar et al. | |
| 2018/0018523 A1 | 1/2018 | Shekhar et al. | |
| 2018/0061459 A1* | 3/2018 | Song | G11B 27/34 |
| 2018/0174600 A1* | 6/2018 | Chaudhuri | G06K 9/00288 |
| 2018/0225519 A1* | 8/2018 | Chen | G06K 9/00751 |

OTHER PUBLICATIONS

Lee, Yong Jai, et al., "Discovering Important People and Objects for Egocentric Video Summarization", IEEE Conference on Computer Vision and Pattern Recognition (CVPR), CVPR Jun. 2012, 9 pages.

Zhang, K, et al., "Summary Transfer: Exemplar-Based Subset Selection for Video Summarization", In Proceedings of the IEEE Conference on Computer Vision and Pattern Recognition, Jun. 2016, 9 pages.

Sharghi, Aidean, Query-Focused Extractive Video Summarization, In European Conference on Computer Vision, Springer, Jul. 2016, 18 pages.

Venugopalan, Subhashini, et al., Improving LSTM-Based Video Description with Linguistic Knowledge Mined from Text, In Conference on Empirical Methods in Natural Language Processing (EMNLP), Nov. 2016, 6 pages.

Socher, Richard, et al., Semi-Supervised Recursive Autoencoders for Predicting Sentiment Distributions, In Proceedings of the Conference on Empirical Methods in Natural Language Processing, Association for Computational Linguistics, Jul. 2011, 11 pages.

Judd, Tilke , et al.,"Learning to Predict Where Humans Look", In IEEE International Conference on Computer Vision, IEEE, 2009, 9 pages.

Wang, Heng, et al., Action Recognition with Improved Trajectories, In IEEE International Conference on Computer Vision, 2013, 8 pages.

Gygli, Michael ,et al., Creating Summaries from User Videos, In European Conference on Computer Vision, Springer, 2014, 16 pages.

Liu, Wu, et al., "Multi-Task Deep Visual-Semantic Embedding for Video Thumbnail Selection", The IEEE Conference on Computer Vision and Pattern Recognition (CVPR), 2015, 9 pages.

Dimitrova, Nevenka, et al., "Video Keyframe Extraction and Filtering: a Keyframe is Not a Keyframe to Everyone," Proceedings of the Sixth International Conference on Information and Knowledge Management, ACM, 1997, 8 pages.

Wang, Zhou, et al. "Image Quality Assessment: From Error Visibility to Structural Similarity," IEEE Transactions on Image Processing, vol. 13, No. 4, Apr. 2004, 14 pages.

Liu Tianming, et al., "A Novel Video Key-Fram-Extraction Algorithm Based on Perceived Motion Energy Model", IEEE Transactions on Circuits and Systems for Video Technology, vol. 13, No. 10, Oct. 2003, 8 pages.

Sharghi, Aidean, et al., "Query-Focused Extractive Video Summarization", Center for Research in Computer Vision, 2017, 1 page.

Jacoby, Larry L., et al., "Separating Consciouos and Unconscious Influences of Memory: Measuring Recollection", Journal of Experimental Psychology General, vol. 122, No. 2, 1993, 16 pages.

* cited by examiner

SUMMARIZING VIDEO CONTENT BASED ON MEMORABILITY OF THE VIDEO CONTENT

TECHNICAL FIELD

This disclosure relates generally to computer-implemented methods and systems for video production and editing. Specifically, the present disclosure involves summarizing video content by generating skims, previews, thumbnails, and other summarized versions of the video content based on memorability of the video content.

BACKGROUND

Video content is widely available and frequently viewed on mobile devices, such as tablets, smart phones, and other mobile computing devices. One factor facilitating the increased accessibility of video content is the convenience and relative low cost of video recording equipment. In some cases, this video recording equipment is a mobile computing device that is the same type of device used to view video content (e.g., a tablet, smartphone, or other mobile computing device).

Applications for recording, sharing, and editing of videos are also very common and have proliferated as the quantity of sharable video content has grown. Video editing and video sharing applications provide a variety of tools for video creators and editors. These tools include the ability of an editor to select and remove scenes or frames of the video.

In some cases, the editor uses these tools to improve the technical quality of the video. However, despite the convenience and accessibility of video editing software, the ability of video content creators to reach viewers is a non-trivial task. For instance, because of the large and ever-increasing body of video content, it is difficult for a video editor or creator to summarize video content in a way that distinguishes the video content (or its summary) from other videos competing for viewers' attention. Existing video editing and sharing tools, however, do not address this challenge.

SUMMARY

Certain embodiments involve generating summarized versions of video content based on memorability of the video content. For example, a video summarization system accesses segments of an input video. The video summarization system identifies memorability scores for the respective segments. The video summarization system selects a subset of segments from the segments based on each computed memorability score in the subset having a threshold memorability score (e.g., a certain number of segments with the highest memorability scores). The video summarization system generates visual summary content from the subset of the segments, such as a preview, set of thumbnails, etc.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
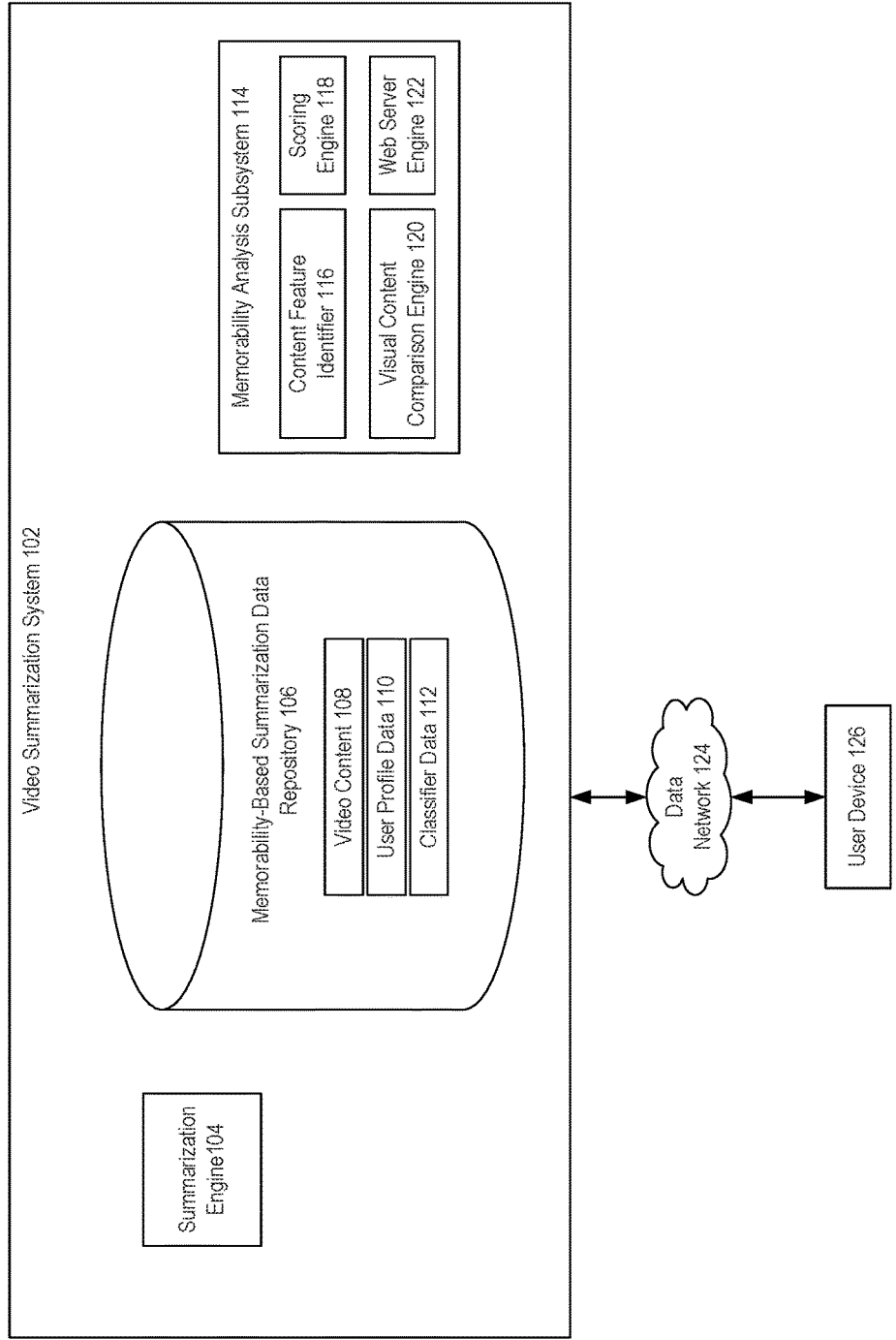
FIG. 1 depicts an example of a computing environment in which a video summarization system summarizes video content based on memorability of the video content.

As discussed above, existing systems are unable to develop summarized video content that captures the most memorable aspect of the original video content for viewers. Certain embodiments described herein can address these deficiencies by generating summarized versions of video content based on memorability of the video content. For instance, a video summarization system determines how memorable each segment of the video is (e.g., the likelihood of a viewer recalling the video segment's content) and generating a summary from a subset of memorable segments. Examples of these summaries include shortened versions of the video, previews or montages of different memorable moments from the video, thumbnail images of different memorable moments from the video, etc. Thus, the video summarization system automatically generates a summarized version of a particular video that is more likely to distinguish itself from other video content available to potential viewers.

The following non-limiting example is provided to introduce certain embodiments. In this example, a video summarization system accesses an input video to be summarized. The video summarization system or another suitable system partitions the input video that is partitioned into segments (e.g., video portions of a user-specified length, video portions of an algorithmically determined length, etc.). The video summarization system automatically analyzes content features of each segment to compute a memorability score for that segment. For instance, a particular segment's memorability is assessed based on a combination of color features in the segment's video content, spatio-temporal features of the segment's video content, semantic information obtained from the segment, etc. The video summarization system selects certain memorable segments, such as the collection of segments that maximize an overall memorability while adhering to a specified length of a summary for the video. The video summarization system assembles the selected segments into the visual summary content. Different types of visual summary content (e.g., skims, previews, etc.), can maintain the original order of events from the input video, reorder events from the input video to highlight more interesting events, etc.

As used herein, the term "segment" refers to a set of multiple frames from a video, where the video itself includes multiple segments. For instance, a segment of a longer video (e.g., five minutes) includes excerpted video content (e.g., the first thirty seconds of the video).

As used herein, the term "memorability" refers to a degree to which a viewer is likely to recall visual content from a video. In some embodiments, the memorability of certain video content is automatically predicted from a semantic description of the video, saliency of the video, color features of the video, spatio-temporal characteristics of the video, or some combination thereof.

As used herein, the term "visual summary content" refers to video content or one or more still images that is derived from an input video and that conveys information regarding the semantic content of a video. One example of visual summary content is a skim. A skim is a shortened version of an input video that retains motion information (i.e., movement of people or objects) and an order of events from the original video. For instance, if an input video depicts events A→B→C→D→E, the skim would include a combination of segments from the input video that depict events A→C→D. Another example of visual summary content is a preview or montage. A preview or montage is a shortened version of an input video that retains motion information (i.e., movement of people or objects), while changing the order of at least some events from the original video. For instance, if an input video depicts events A→B→C→D→E, a preview could include a combination of segments from the input video that depict events D→A→C. Another example of visual summary content is a set of thumbnails. A thumbnail is a still image extracted from a video segment. For instance, if an input video depicts events A→B→C→D→E, a set of thumbnails could include key frames from the segments that depict events A and C.

As used herein, the term "video features" includes the color, saliency, semantics and spatio-temporal features of a video segment. In various embodiments, video features are determined from various suitable portions of a video, e.g., an entire video, scenes (i.e., segments of adjacent video frames), individual video frames, an image within a frame, an object within a frame, and a portion of an image within a frame. A given video feature may be organic to the original video captured by an imaging device, or an add-in that was edited into the video using an editing tool.

FIG. 1 depicts an example of a computing environment 100 in which a video summarization system 102 summarizes video content 108 based on memorability of the video content 108. The computing environment 100 includes the video summarization system 102 and one or more user devices 126 that are communicatively coupled to the video summarization system 102 via one or more data networks 124. The video summarization system 102 includes a summarization engine 104, a memorability-based summarization data repository 106, and a memorability analysis subsystem 114.

The summarization engine 104 is executed by one or more processing devices of the video summarization system 102 to visually summarize the video content 108. For instance, the summarization engine 104 accesses segments of the video content 108 and uses memorability scores of the segments to select the most memorable segments. The summarization engine 104 generates a preview, skim, set of thumbnails, or other visual summary content from these memorable segments.

The memorability-based summarization data repository 106 includes one or more non-transitory computer-readable media that stores video content 108, user profile data 110, and classifier data 112, where these datasets are stored in one or more suitable data structures. In some embodiments, the video summarization system 102 receives the video content 108 from one or more user devices 126 in the original, unanalyzed form. In additional or alternative embodiments, the video content 108 also includes any analytical results produced by the memorability analysis subsystem 114, videos that have been edited with user devices 126, etc.

The user profile data 110 enables users to separately store transmitted video content in any stage of editing and memorability analysis associated with the user. In some embodiments, the user profiles also include login credentials, user demographic information, user preferences, social connections between the user and others, contact information for socially connected users, and other tools facilitating the editing and sharing of video content. The user profile data 110 includes, for example, user login credentials. In some embodiments, user login credentials are used to provide a secure storage location of user transmitted video content. For example, the video summarization system 102 could limit access to the memorability analysis subsystem 114 to authorized users identified from the user login credentials. In additional or alternative embodiments, the user profile data 110 includes one or more of user preferences, user demographic information, social connections, and user demographic information. Some or all of this information is used to provide convenient mechanisms for storing, editing, and sharing analyzed videos.

The classifier data 112 includes any content used to train one or more classifiers used by the memorability analysis subsystem 114. The memorability analysis subsystem 114 executes these trained classifiers to provide memorability analysis in a computationally efficient manner, as described in further detail herein.

The memorability analysis subsystem 114 analyzes the memorability of features from the video content 108. For example, the memorability analysis subsystem 114 analyzes video content for memorability, identifies content features within a video more likely to be memorable, and provides information about the memorability to the summarization engine 104.

The memorability analysis subsystem 114 computes a predicted memorability score that is predictive of an actual memorability score, where the actual memorability score could be obtained by surveying a set of viewers. For instance, in such a survey, a target video i could be seen by a participant j. The actual memorability score MemScore for this scenario is:

$$MemScore(i, j) = \begin{cases} \dfrac{r(i; j)}{\overline{r(j)}} & \text{correct recall} \\ 0 & \text{otherwise} \end{cases}.$$

In this example, $r(i; j)$ is the time left for participant j in recalling video i, and $\overline{r(j)}$ is the mean time left for participants in correctly recalling the videos. For incorrect responses, the time left is taken to be 0. For the video i, the memorability analysis subsystem 114 computes a final memorability score, MemScore(i), that is the average score across a set of participants, where $N_i$ is the number of participants watching video i:

$$MemScore(i) = \frac{\sum_{j=1}^{N_i} MemScore}{N_i}.$$

In some embodiments, such as the example depicted in FIG. 1, the memorability analysis subsystem 114 includes one or more of a content feature identifier 116, a scoring engine 118, a visual content comparison engine 120, and a web server engine 122. The content feature identifier 116 executes one or more operations for identifying one or more video features within a video. The scoring engine 118 executes one or more operations for scoring the identified features with respect to memorability. The result of operations performed by the content feature identifier 116 and the scoring engine 118 is a video memorability score associated video features.

The web server engine 122 configures one or more devices of the video summarization system 102 to provide video summary content to one or more user devices 126 via the data network 124. The web server engine 122 serves web pages, as well as other web-related content, such as JAVA®, XML®, FLASH®, etc. In some embodiments, the web server engine 122 receives video content from a user device 126, transmits memorability analysis results (e.g., summary content, recommendations, etc.) to a user device, and facilitates the publication, transmission, and sharing of videos. In additional or alternative embodiments, the web server engine 122 provides an application programming interface ("API") for transmitting data directly to native client device operating systems, such as IOS®, ANDROID™, WEBOS®, etc. The web server engine 122 can also provide API functionality for exchanging data with the user device 126.

In some embodiments, the memorability analysis subsystem 114 also includes functions that enable the sharing of video content analyzed and edited for memorability improvement. In these embodiments, a user optionally transmits instructions to the memorability analysis subsystem 114 in response to receiving results of the memorability analysis that permit access to a video. The access permitted can be restricted to those expressly permitted by the user, other users socially connected to the user, or accessible without any restriction. Using a semantic analysis described herein with respect to FIG. 4, the memorability analysis subsystem 114 recommends an analyzed, and optionally edited, video to users of the system based on a comparison of user profile information to the results of the semantic analysis.

The user device 126 is a computing device that receives user input and communicates data via the data network 124. In some embodiments, the user device 126 is a computer system such as a desktop or laptop computer. In additional or alternative embodiments, the user device 126 is a device having computer functionality, such as a mobile telephone, a tablet computer, a smartphone, or a similar device. In some embodiments, the user device 126 is a mobile computing device used for recording video content by a first user and an analogous mobile computing user device is used for viewing video content. The user device 126 is configured to communicate with the video summarization system 102 via one or more data networks 124. In some embodiments, the user device 126 executes an application allowing a user of the user device 126 to interact with the memorability analysis subsystem 114, thus becoming a specialized computing machine. For example, the user device 126 executes a browser application to enable interaction between the user device 126 and the memorability analysis subsystem 114 via the data network 124. In additional or alternative embodiments, a user device 126 interacts with the memorability analysis subsystem 114 through an application programming interface (API) that runs on the native operating system of the user device 126, such as IOS® or ANDROID™.

The user device 126 communicates via the data network 124, which may include any combination of local or wide area networks, using both wired and wireless communication systems. In some embodiments, the data network 124 uses standard communications technologies or protocols. In addition, all or some of the communications via the data network 124 can be encrypted using encryption technologies such as secure sockets layer, transport layer security, Internet Protocol security, etc.

Examples of Summarizing Video Content Using Memorability Scores

Figure 2:
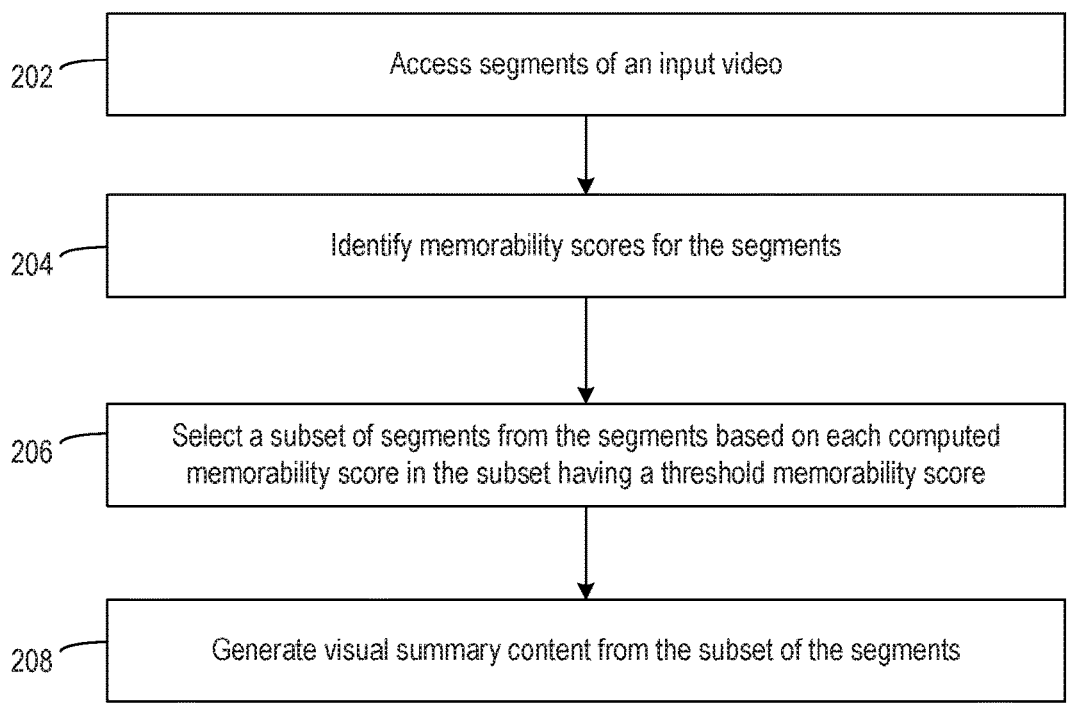
FIG. 2 depicts an example of a process for summarizing video content based on memorability of the video content, according to certain embodiments of this disclosure.

FIG. 2 depicts an example of a process 200 for summarizing video content based on memorability of the video content. The process 200 incorporates video memorability criterion into a summarization process, either alone or in combination with other video metrics such as representativeness or uniformity. For example, video summarization could use a sub-modular optimization technique that combines different criterion into the summarization aspect.

In some embodiments, one or more processing devices from the video summarization system 102 implement operations depicted in FIG. 2. For instance, one or more processing devices execute suitable program code (e.g., the summarization engine 104) having one or more algorithms encompassed by the process 200. For illustrative purposes, the process 200 is described with reference to various examples described herein. But other implementations are possible.

In block 202, the process 200 involves accessing segments of an input video. For instance, the video summarization system 102 retrieves the segments from a memory device for use in the process 200. In some embodiments, the summarization engine 104 partitions the input video into the segments prior to accessing the input video. In one example, the summarization engine 104 partitions the input video into segments of equal length. The summarization engine 104 receives the specified length as user input from a user device 126. In another example, the summarization engine 104 partitions the input video into segments by executing a suitable segmentation algorithm.

To implement block 202, one or more processing devices execute the summarization engine 104 to access the segments of video content 108 from the memorability-based summarization data repository 106. In some embodiments, the memorability-based summarization data repository 106 is stored on a non-transitory computer-readable medium that is local to the computing system that executes the summarization engine 104. Accessing the segments from the video content 108 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the summarization engine 104. In additional or alternative embodiments, the summarization engine 104 accesses, via one or more data networks, at least some of the segments of video content 108 from a memorability-based summarization data repository 106 that is stored on a non-transitory computer-readable medium remote from the computing system that executes the summarization engine 104. Accessing the segments from the video content 108 involves transmitting suitable electronic signals via a network interface device that communicatively couples, via one or more data networks, a computing system that executes the summarization engine 104 with another computing system that is communicatively coupled to the non-transitory computer-readable medium via a data bus or other form of local access. These signals cause at least some of the data from the non-transitory computer-readable medium to be transmitted over the data network, received via the network interface device of the computing system that executes the summarization engine 104, and stored in a random-access memory or other memory device, where the memory device allows rapid retrieval of data for processing operations performed by the computing system that executes the summarization engine 104.

In block 204, the process 200 involves identifying memorability scores for the segments, respectively. For example, one or more processing devices execute the summarization engine 104 to compute or otherwise identify a video memorability score for each segment. In some embodiments, one or more the summarization engine 104 and the memorability analysis subsystem 114 computes a given segment's video memorability score from video features in the segment. The summarization engine 104 identifies these computed scores at block 204. Examples of computing video memorability scores are described herein with respect to FIGS. 3 and 4.

In block 206, the process 200 involves selecting a subset of segments from the segments based on each computed memorability score in the subset having a threshold memorability score. For example, one or more processing devices execute the summarization engine 104 to compare the video memorability scores for the various segments. The summarization engine 104 includes some of the segments with sufficiently large video memorability scores in the subset. The summarization engine 104 also excludes, from the subset, other segments with insufficiently large video memorability scores. In this manner, the summarization engine 104 identifies and selects certain segments having a threshold memorability score for use in generating different types of summary content (e.g., skims or other summaries, previews or other montages, thumbnails, etc.).

In some embodiments, the summarization engine 104 determines that a given segment has a threshold memorability score based on that segment's memorability score having a certain rank among the set of memorability scores. For instance, the summarization engine 104 ranks the segments according to the computed memorability scores. The ranking operation applies a first rank to a first segment and a second rank to a second segment, wherein the first segment has a first memorability score that is higher than a second memorability score for the second segment. The summarization engine 104 determines which of the ranks is greater than the other. The segment with the higher rank is included in the selected subset of segments, and the segment with the lower rank is excluded from the selected subset of segments. For instance, the summarization engine 104 could select a subset of k segments from a set of N segments of the input video based on the subset of k memorability scores being the highest memorability scores from the set of N memorability scores.

In block 208, the process 200 involves generating visual summary content from the subset of the segments. For example, one or more processing devices execute the summarization engine 104 to generate the summary content from sufficiently memorable video segments. In some embodiments, the summary content includes visual content (e.g., shortened video content, still images, etc.) that conveys one or more semantic meanings of the input video content. In additional or alternative embodiments, the summary content includes textual content, which can be extracted or derived from one or more selected segments, that describes one or more semantic meanings of the input video content.

The summarization engine 104 generates the summary content based on a memory criterion for a subset of segments. In one example, the memorability criterion for a set of segments extracted from the video is defined as follows:

$$MemCriterion(\{VS_i\}_{i \in K}) = \sum_{i \in K} MemScore(VS_i).$$

In this example, $VS_i$ is segment i out of the N segments of the input video, and $K \subset \{1, 2, \ldots, N\}$ is a subset of segments selected at block 206. The function in this example has the property of sub-modularity, which is suitable for fit in certain optimization techniques.

In some embodiments, the summarization engine 104 generates summary content, such as a skim or other dynamic video summary, that is a shortened version of the input video. This skim or other dynamic video summary retains motion information and conveys the same or similar semantic meaning as the initial video. For instance, the skim or other dynamic video summary could include video segments that convey some or all crucial events in a story. The skim or other dynamic video summary orders these segments in the same order as the input video. In this manner, the summary video functions as a shorter version of the input video while being consistent with respect to the input video's sequence of events and crucial story elements. The summarization engine 104 outputs the skim or other dynamic video summary as the summary content.

In additional or alternative embodiments, the summarization engine 104 generates the summary content by combining the selected subset of segments into a montage or other preview. The montage or other preview retains motion information, but may not convey the same semantic meaning as the input video. For instance, a montage or other preview may omit crucial events in a story conveyed by the input video, reorder one or more events from the input video, etc. The summarization engine 104 could create the montage by ordering video segments in accordance with their memorability (e.g., building from least memorable to most memorable), alternating video segments based on their memorability (e.g., sequencing pairs of high-memorability and low-memorability segments), or otherwise order the video segments in a manner that disregards, for at least some segments, the original ordering from the input video. The summarization engine 104 outputs the montage or other preview as the summary content.

In some embodiments, the summarization engine 104 generates summary content based on a summary length (e.g., a "budget") that is provided to the video summarization system 102. For instance, the summarization engine 104 identifies a summary length for the visual summary content. The summary length could be received as user input from a user device 126 via the data network 124. The summarization engine 104 selects a summary subset of segments having a combined length that is less than or equal to the summary length. The summary subset includes a smaller number of segments than the subset of segments.

In one example, the summarization engine 104 selects the longest segment, then the next longest segment, and so on until the summary length is satisfied, without regard to different memorability scores within the selected subset from block 206. In another example, the summarization engine 104 selects the shortest segment, then the next shortest segment, and so on until the summary length is satisfied, without regard to different memorability scores within the selected subset from block 206. In another example, the summarization engine 104 selects the segment having the largest memorability score and a length (e.g., two minutes) that is less than the summary length (e.g., five minutes). For instance, if a first segment has the highest memorability score and a length that exceeds the summary length, while a second segment has the second-highest memorability score and a length that is less than the summary length, the summarization engine 104 selects the second segment. Continuing with this example, the summarization engine 104 also selects the segment having the next largest memorability score and a length (e.g., 90 seconds) that is less than the difference between summary length and the previously selected segment (e.g., three minutes), and so on until the summary length is satisfied. For instance, a third segment could have the highest remaining memorability score and a length whose combination with the previously selected segment's length would exceed the summary length, while a fourth segment could have the second-highest remaining memorability score and a length whose combination with the previously selected segment's length would not exceed the summary length. In this scenario, the summarization engine 104 would select the fourth segment. The summarization engine 104 could continue in this manner until the summary length is satisfied.

In additional or alternative embodiments, the summarization engine 104 generates summary content based on a combination of the memorability scores and one or more other video metrics, such as video uniformity and video representativeness. For instance, the summarization engine 104 identifies one or more optimization objectives for the summary, which can include memorability as well as representativeness, uniformity, or diversity. The summarization engine 104 receives weight values for any identified objectives. In some embodiments, the weights can also be learned if a corpus of videos and their curated summaries are available. The summarization engine 104 computes values for various optimization objectives (e.g., memorability, uniformity, diversity, and representativeness) from features of the video segments. The criteria computation may be performed using a combination of segments or individual segments. A final objective function is a weighted sum of the various optimization objectives using the received weights. The summarization engine 104 optimizes the objective function using sub-modular optimization or other suitable optimization techniques.

In one example, the summarization engine 104 determines that the summary subset is less than or equal to the summary length and that the summary subset maximizes a sum of criteria scores for respective segments in the summary subset. A criteria score could include a combination of (i) a memorability score for a segment that is weighted by a memorability weight and (ii) at least one additional video metric weighted by an additional video metric weight. Examples of additional video metrics include video uniformity, video representativeness, etc.

For instance, for a video v partitioned into N segments, $\{s_i\}_{i=1}^{N}$, the summarization engine 104 uses a memorability objective, VidMem, to select a subset of $K \subset \{1, 2, \ldots, N\}$ segments. The memorability objective VidMem could be defined as:

$$VidMem = \sum_{i \in K} MemScore(s_i).$$

In this example, MemScore($s_i$) is the computed memorability score for segment $s_i$. The objective function is sub-modular. The summarization engine 104 access various functions for scoring summaries with respect to memorability (VidMem), uniformity (VidUnif), and representativeness (VidRep). The summarization engine 104 uses the following objective criteria for selecting the summary subset $y_{opt}$:

$$y_{opt} = \underset{y \in 2^V, |y| \leq L}{\operatorname{argmax}} \sum_{f \in F} w_f f(y; v).$$

In this formula, L is the summary length, F:={VidMem, VidRep,VidUnif}, f(y;v) is the criteria score using f, and weights w the memorability weight and any additional video metric weights. In some embodiments, one or more training algorithms are executed that output learned weights. An example of such a training algorithm is the supervised sub-modular optimization described in M. Gygli et al., "Video Summarization by Learning Submodular Mixtures of Objectives," *In IEEE Conference on Computer Vision and Pattern Recognition*, June 2015, which is incorporated by reference herein.

In additional or alternative embodiments, the summarization engine 104 generates the summary content by extracting and providing a set of thumbnail images for the video, without retaining motion information in the summary content. For instance, the summarization engine 104 could compute visual quality scores for the subset of segments. A particular visual quality score can be computed for each segment, for each frame of each segment, or for one or more key frames from each segment. The summarization engine 104 extracts thumbnail images from the subset of the segments based on the visual quality scores. The summarization engine 104 selects the extracted thumbnail images as the set of thumbnail images. The summarization engine 104 outputs the selected set of thumbnail images as the summary content.

Examples of Computing a Memorability Score

Figure 3:
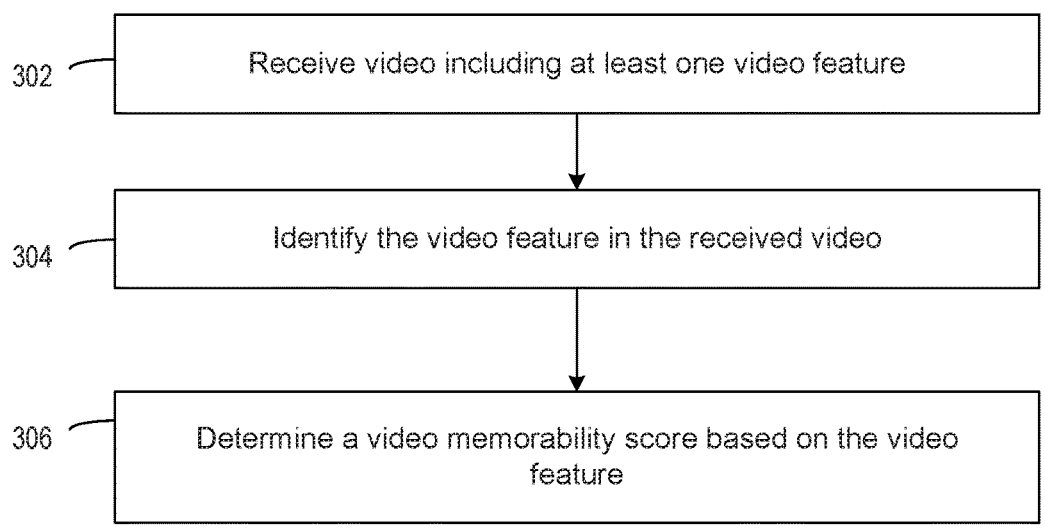
FIG. 3 depicts an example of a process for computing a memorability score used in the process of FIG. 2 for summarizing video content, according to certain embodiments of this disclosure.

FIG. 3 depicts an example of a process 300 for producing a memorability score for video content using one or more video features. One or more features being scored may be organic features of the originally captured video, add-in features, or a combination thereof. In some embodiments, one or more processing devices from the video summarization system 102 implement operations depicted in FIG. 3. For instance, one or more processing devices execute suitable program code (e.g., one or more engines from the memorability analysis subsystem 114) having one or more algorithms encompassed by the process 300. For illustrative purposes, the process 300 is described with reference to various examples described herein. But other implementations are possible.

In block 302, the process 300 involves receiving video content that includes at least one video feature. For example, the memorability analysis subsystem 114 receives video content 108 by retrieving it from the memorability-based summarization data repository 106. In some embodiments, the memorability analysis subsystem 114 also obtains or otherwise receives a ground truth input. The ground truth input can be obtained from, for example, data describing the results of a memorability survey provided to viewers of other video content.

In block 304, the process 300 involves identifying a video feature. One or more processing devices of the memorability analysis subsystem 114 execute the content feature identifier 116 to perform one or more identification operations for identifying the video feature.

One or more suitable features are extracted or otherwise identified at block 304. For example, the memorability analysis subsystem 114 computes one or more of a video semantics feature, a saliency feature, a spatio-temporal feature, and a color feature.

In some embodiments, a video semantics feature is generated by using a suitable captioning method to generate a semantic description of a video (e.g., a video segment) and applying a recursive auto-encoder network to the semantic description. The received video is provided to an auto-captioning operation executed by the memorability analysis subsystem 114. The auto-captioning operation automatically generates a textual summary of the semantic content of the video. To extract at least one video semantics feature, the textual summary generated by the auto-captioning is analyzed using a recursive autoencoder network. The recursive autoencoder network analyzes the text of text features to extract a semantic meaning from the text features via a fixed-dimension vector. For instance, the recursive auto-encoder network generates a multi-dimensional of the video content (e.g., a 100-dimensional vector representation). A regressor (e.g., a random forest regressor, a gradient boosting regressor, or logistic regressor) or other predictor is applied to the semantic feature. The regressor or other predictor generates a component memorability score from the semantic feature. The regressor or other predictor is trained to predict a memorability of video content, where the training involves evaluating user-generated memorability values with respect to training semantic features. The user-generated memorability values are associated with training videos, and the training semantic features are generated by applying the auto-captioning operation to those training videos.

In additional or alternative embodiments, a saliency feature (e.g., an aspect of visual content that attracts human attention) is computed by generating saliency probability maps on sets of frames (e.g., 10 frames) extracted at uniform intervals from the video content, averaging the saliency maps over the frames, resizing the averaged map (e.g., to 50×50), and vectorising the results to obtain a vector representation of the saliency of the video content. A regressor or other predictor (e.g., a random forest regressor, a gradient boosting regressor, or logistic regressor) is applied to the saliency feature. The regressor or other predictor generates a component memorability score from the saliency feature. The regressor or other predictor is trained to predict a memorability of video content, where the training involves evaluating user-generated memorability values with respect to training saliency features. The user-generated memorability values are associated with training videos, and the training saliency features are generated by applying a saliency analysis to those training videos.

In additional or alternative embodiments, a spatio-temporal feature is generated by applying a dense trajectory method to extract a multi-dimensional vector representing one or more spatio-temporal aspects of the video (e.g., a 4000-dimensional vector). A regressor or other predictor is applied to the spatio-temporal feature. The regressor or other predictor (e.g., a random forest regressor, a gradient boosting regressor, or logistic regressor) generates a component memorability score from the spatio-temporal feature. The regressor or other predictor is trained to predict a memorability of video content, where the training involves evaluating user-generated memorability values with respect to training spatio-temporal features. The user-generated memorability values are associated with training videos, and the training spatio-temporal features are generated by applying a spatio-temporal analysis to those training videos.

In additional or alternative embodiments, a color feature is generated by averaging the hue and saturation histograms for sets of frames extracted at uniform intervals from the video (e.g., 50-binned hue and saturation histograms for sets of 10 frames), followed by concatenation of the averaged histograms. A regressor or other predictor (e.g., a random forest regressor, a gradient boosting regressor, or logistic regressor) is applied to the color feature. The regressor or other predictor generates a component memorability score from the color feature. The regressor or other predictor is trained to predict a memorability of video content, where the training involves evaluating user-generated memorability values with respect to training color features. The user-generated memorability values are associated with training videos, and the training color features are generated by applying a color analysis to those training videos.

In block 306, the process 300 involves determining a video memorability score that is based on one or more video features that are extracted or otherwise identified at block 304. One or more processing devices of the memorability analysis subsystem 114 execute the scoring engine 118 to perform one or more operations for determining these scores. In some embodiments, the analysis subsystem 114 computes the video memorability score from an averaging operations that combines various score contributions from features identified at block 304 (e.g., a score contribution from the video semantics feature, a score contribution from the spatio-temporal feature, a score contribution from the saliency feature, and a score contribution from the color feature).

For example, the memorability analysis subsystem 114 can apply a suitable memorability predictor (e.g., the content feature identifier 116, the scoring engine 118, etc.) to the video feature score contributions. For example, the content feature identifier 116 applies a set of regressors (e.g., a random forest regressor, a gradient boosting regressor, or logistic regressor) to the video feature score contributions to provide a memorability score. As discussed above, a respective regressor can be trained separately for each type of video feature (e.g., saliency, color, semantic, spatio-temporal) to generate component scores for the respective video feaures. A memorability score outputted at block 306 can be the average memorability score of the component scores computed by the various regressors.

In some embodiments, one or more of the component scores from the video semantics feature, the spatio-temporal feature, the image saliency feature, and the color feature are weighted by a multiplier. A multiplier applied to a given component score is used to change the relative weight of the contributions from each of the features.

Although end users may wish to obtain the memorability score for the full video, when evaluating shorter videos (e.g., 15-30 seconds), evaluating longer videos (e.g., 10-15 minutes) may involve segmenting the video content for analysis. Thus, in some embodiments, the process 300 is applied to video content that is segmented into sub-shots. For instance, at block 302, the memorability analysis subsystem 114 receives one or more segmentation parameters that indicate how to segment the video into sub-shots. In some embodiments, these parameters indicate a constant segment length (e.g., segments of 5-10 seconds). In other embodiments, these parameters may be used by a suitable algorithm to automatically segment the video content. The process 300 applies blocks 304 and 306 for each of the resulting segments, where the feature-extraction and memorability-calculation are performed for each segment in the same manner described above.

Any suitable image saliency algorithm can be used to extract or otherwise identify saliency features. An image saliency algorithm analyzes video to identify, independent of any temporal factors, specific objects and images prominently displayed within the video that are more likely to be attract a viewer's attention. The content feature identifier 116 determines, from this analysis, a corresponding contribution to the video feature score generated. For instance, objects and images identified as likely to be draw a viewer's attention provide a higher contribution to a resultant memorability score than those objects and images identified as less likely to draw a user's attention. The image saliency algorithm produces, based on the identification, a saliency score that is a component of the memorability score (e.g., a component score used in the averaging operation described above).

In some embodiments, the image saliency algorithm includes functions that evaluate color and shape of an object or image. For example, brightly colored objects, or objects of a color that contrasts with a surrounding background color, are identified as more salient than those colors that are dull or that do not contrast with their surroundings. Saliency functions are also optionally determined, in part, by a portion of a display area occupied by an image, a position within the screen that an image occupies, or both. In one non-limiting example, a video with a scene of distant people occupying a small percentage of a display could be less memorable than a scene with people placed in the middle of the display field occupying 20-50% of available display area.

In one example, the image saliency algorithm involves generating saliency probability maps for a set of frames (e.g., 10 frames) extracted at uniform intervals from a video or video segment. The image saliency algorithm also involves averaging the saliency maps over the frames, resizing the averaged map to a given dimension (e.g., 50×50), and vectorising the resized map.

Any suitable spatio-temporal algorithm can be used to extract or otherwise identify spatio-temporal features. A spatio-temporal algorithm identifies video features having relative movement between images within the video. This spatio-temporal algorithm analysis provides a corresponding contribution to the memorability score that is proportional to the speed of movement, the proportion of a field of view of the video content that is moving, or both. These moving (or dynamic) video features are more likely to be memorable to a viewer than static images. In some embodiments, the spatio-temporal algorithm involves setting a spatio-temporal frame of reference using the video itself and identifying video features that are moving relative to the frame of reference. For example, a first series of images in a video that depict a vehicle traversing an entire width of a field of view in the video over a unit of time, and a second series of images depicts snow traversing only a portion of the field of view in the video over the same unit of time. The first series of images is labeled as a faster spatio-temporal movement than the second series of images based on the entire width of the field of view being traversed in the first series of images. Using this frame of reference also removes spatio-temporal artifacts, such a camera shake, that appear to cause movement in the video but affect the entire image uniformly. Because viewers are more likely to remember faster movement than slower movement, faster spatio-temporal movement provides a larger contribution to a content feature memorability score than slower spatio-temporal movement. Similarly, viewers are more likely to remember images or scenes in which more of the field of view is moving. The spatio-temporal algorithm generates a spatio-temporal score that is used, in part, to determine a memorability score (e.g., a component score used in the averaging operation described above).

Memorability Training

The content feature identifier 116 and the scoring engine 118 used in the processes 300 and 400 can be trained in any suitable manner. For instance, the classifier data 112 can include target videos from a memorability survey and a collected ground truth data. These types of classifier data 112 can be provided as inputs to a training system. Examples of a training system include the memorability analysis subsystem 114, another subsystem in the video summarization system 102, or another computing system separate from the video summarization system 102.

In one example, the training system can train a memorability predictor (e.g., the content feature identifier 116, the scoring engine 118, etc.) using the video features and the ground truth through five-fold cross-validation. Random forest regressor or other suitable regression methods can be deployed. The regressor is trained separately for each feature. The output training prediction is the average prediction score of the regressors.

Video Memorability Computation Using Text Features

In some embodiments, one or more text features can be used, in addition to video features, for computing the memorability of video content. Examples of text features include, but are not limited to, text accompanying a video or video feature, such as captions, titles, subtitles, comments, labels corresponding to frames and images, names, and other text annotations of a video. A given text feature may be organic to the original video captured by an imaging device, or an add-in that was edited into the video using an editing tool.

In these embodiments, the content feature identifier 116 executes one or more operations for identifying one or more text features within a video in addition to video features. One or more the summarization engine 104 and the memorability analysis subsystem 114 computes a given segment's video memorability score from a combination of a video feature score, which indicates a memorability of a video feature from the segment, and a text feature score, which indicates a memorability of a text feature from text associated with the segment.

Figure 4:
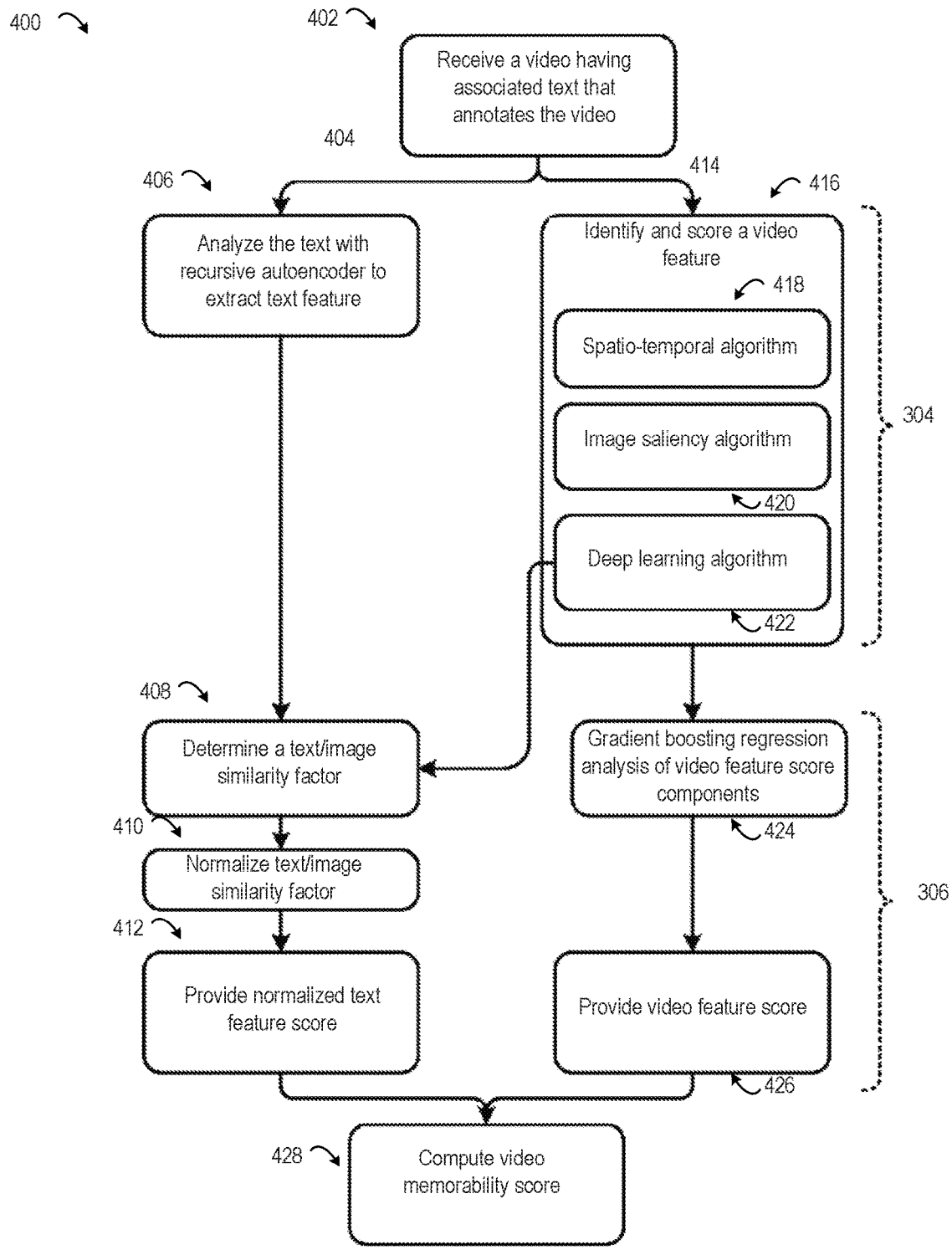
FIG. 4 depicts an example of a process for computing a memorability score using text features in addition to video features, according to certain embodiments of this disclosure.

FIG. 4 depicts an example of a process 400 for analyzing a video to produce a video memorability score for video content based on both video features and text features. One or more processing devices from the video summarization system 102 implement operations depicted in FIG. 4. For instance, one or more processing devices execute suitable program code (e.g., one or more engines from the memorability analysis subsystem 114) having one or more algorithms encompassed by the process 400. In embodiments involving the use of text features, one or more operations depicted in FIG. 4 can be used to extract content features from a video at block 304 of the process 300, to compute the memorability score at block 306 of the process 300, or both. For illustrative purposes, the process 400 is described with reference to various examples described herein. But other implementations are possible.

At block 402, the process 400 involves receiving a video having associated text that annotates the video. The text annotation may be organic to the originally captured video or added to the video after the video was captured by operation of a video editing tool. For instance, a video caption system can generate a semantic description of a video segment. An example of a video-captioning method is described in S. Venugopalan et al., "Improving LSTM-based Video Description with Linguistic Knowledge Mined from Text," *Conference on Empirical Methods in Natural Language Processing (EMNLP)*, 2016, which is incorporated by reference herein.

The process 400 also involves generating a normalized text feature score from the text via operation 404. For example, at block 406, the process 400 involves analyzing the text with a recursive autoencoder to extract one or more text features. The content feature identifier 116 executes the recursive autoencoder to extract a semantic meaning from the text features. The content feature identifier 116 generates a semantic vector (e.g., a fixed-dimension vector) that represents the semantic meaning. One example of a semantic autoencoder used to extract semantic meaning from text is a semi-supervised recursive autoencoder. Other autoencoders may also be used to analyze text, identify text features, and extract a semantic meaning from the identified text features.

The operation 404 of the process 400 also includes determining a text/image similarity factor, as depicted at block 408. For example, the scoring engine 118 compares the semantic vector generated by the content feature identifier 116 with semantic descriptions of objects in a video (described below with respect to the operation 414). The scoring engine 118 determines, from the comparison, whether a particular video or video feature is memorable. For instances, video images that are accompanied by descriptive text are generally more memorable than video images without accompanying text or video images with accompanying text that is not descriptive. The scoring engine assigns a similarity factor to the determined text-image similarity, where the similarity factor is a value indicating a degree of similarity between the text feature of the video content and a video feature of the video content.

The operation 404 of the process 400 also includes normalizing the similarity factor. For example, the scoring engine 118 normalizes the similarity factor from block 410 using a sigmoid function into a normalized text feature score having a value between 0 and 1, thereby providing a normalized text feature score at block 412.

The process 400 also involves generating a normalized video feature score from the video content via the operation 414. For instance, the process 400 involves identifying and scoring at least one video feature, as depicted at block 416. The content feature identifier 116 analyzes the video and scores at least one video feature from the video. In this example, the content feature identifier 116 implements block 416 by executing a spatio-temporal algorithm, an image saliency algorithm, and a deep learning algorithm.

Block 418 involves executing a spatio-temporal algorithm, examples of which are described above with respect to FIG. 3. The spatio-temporal algorithm generates a spatio-temporal score that is used, in part, to determine a video feature score. Block 420 involves executing the image saliency algorithm, examples of which are described above with respect to FIG. 3. The image saliency algorithm produces, based on the identification, a saliency score that is another component of the video feature score.

Block 422 involves executing a deep learning algorithm. The deep learning algorithm executed at block 422 can be the same as the text captioning operation described above or used to implement the text captioning operation described above. For instance, the deep learning algorithm identifies content features that are likely to be memorable to viewers and generates, based on this identification, another component of the video feature score. The deep learning algorithm is trained to identify memorable features in any suitable manner. The training can involve learning to associate training content (e.g., an entire video, frames in a video, images extracted from a video, etc.) with corresponding semantic descriptions. At block 422, the trained deep learning algorithm analyzes the video, identifies video features, and associates a semantic description with each of the recognized video features. These semantic descriptions are provided to block 408, which is described above. These semantic descriptions are also used to produce a deep learning score. The deep learning score is a component of the video feature score.

In some embodiments, one or more of the contributions from the spatio-temporal algorithm, the image saliency algorithm, and the deep learning algorithm are weighted by a multiplier. The multiplier is used to change the relative weight of the contributions from each of the three analyses.

At block 424, the process 400 involves performing gradient boosting regression analysis of the video feature score components outputted by block 416. For example, the content feature identifier 116 applies a regressor (e.g., a gradient boosting regressor, a random forest regressor, or logistic regressor) to provide a video feature score at block 426. Regression functions other than a gradient boosting regressor may also be applied to the video feature score contributions from a spatio-temporal algorithm, an image saliency algorithm, a deep learning algorithm, etc.

The process 400 also involves computing a video memorability score. In some embodiments, the scoring engine 118 multiplies the normalized text feature score outputted at block 412 and the video feature score outputted at block 426 to generate the video memorability score.

Video Memorability Analysis and Improvement

One benefit of the process 400 is that the analysis provides video editors and creators with information regarding the memorable content features of a video. Even if the video being analyzed is not the work of the video editor or creator performing the process 400, the process 400 provides information that is helpful for understanding the content features that make a video memorable. As is described below in more detail, some embodiments of the present disclosure not only identify which content features of a video are more likely to be memorable, but also provide recommendations regarding the application of image styles to improve memorability of a video.

Figure 5:
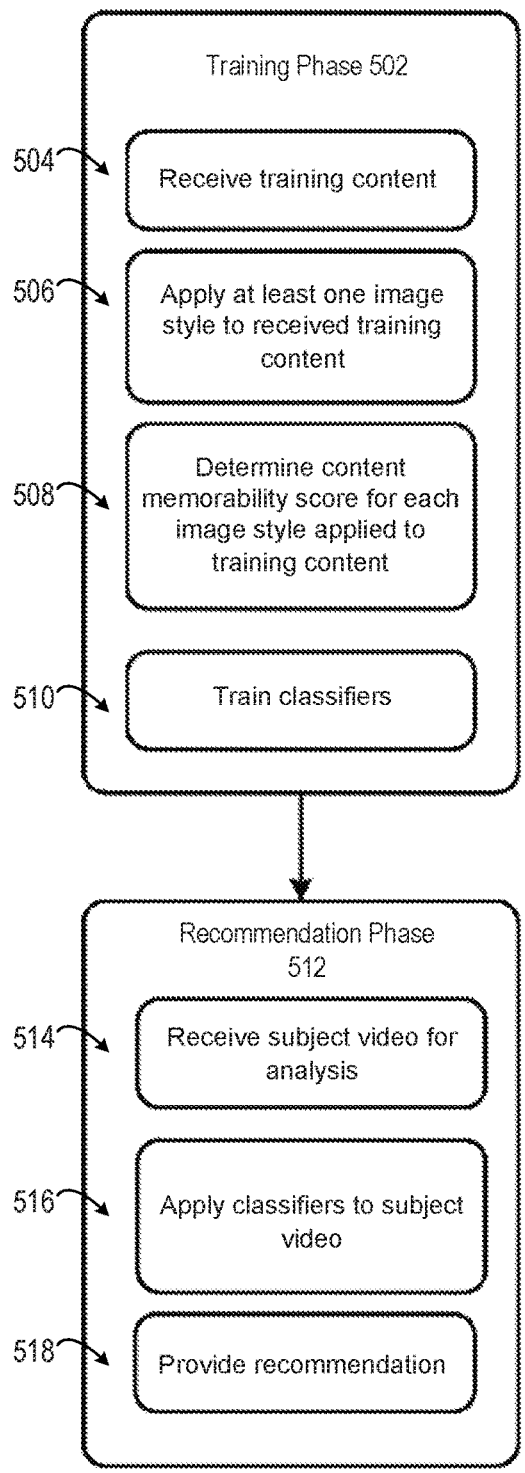
FIG. 5 is a flow diagram for creating a tool for providing recommendations to improve memorability a video and a content feature in the video, according to certain embodiments of this disclosure.

FIG. 5 illustrates a process 500 for creating a tool for providing recommendations to improve memorability of a video, at least one content feature within a video, and combinations thereof. The process 500 is illustrated as having two operations: a training phase 502 and a recommendation phase 512.

The training phase 502 receives training content 504, such as training videos and training content features, that are used to generate reference data regarding the effect of image styles on memorability. At least one image style is applied to the received training content (e.g., a video) at block 506. In some embodiments, multiple available image styles available are applied individually and in various combinations so that a complete understanding of the effect of image styles (and any combinations thereof) on content feature memorability is developed. For each image style, and each combination of image styles, a video memorability score is determined according to process 300 and 400 described above. The video memorability score is determined at block 508 for an entire video in some embodiments or individual content features in other embodiments. Classifiers for each image style are trained at block 510 using the determined memorability scores. In some embodiments, the classifiers improve computational efficiency when determining a recommendation for improving memorability of a video provided by a user.

The training is applied to help editors and video creators improve the memorability of video in recommendation phase 512. A subject video is received for analysis at block 514. The classifiers trained in the training phase 502 are applied to the received subject video at block 516. Using the trained classifiers, the memorability of the subject video is analyzed for each image style available. The memorability analysis subsystem 114 generates, at block 518, a recommendation that is based on a ranked list of the memorability scores predicted by the classifiers for each of the image styles and each of the analyzed content features.

One benefit of the techniques provided herein, according to some embodiments, includes providing video creators and editors an analytical tool that indicates the likelihood or probability that a video will be memorable to a viewer. Another benefit of the techniques provided herein, according to some embodiments, includes identifying and analyzing one or more content features in a video, and determining corresponding memorability scores for each of the identified and analyzed content features. Again, note that such features may be organic features of the originally captured video or add-in features. This helps editors and creators understand how to improve memorability of a video, particularly with respect to video scenes, frames, or images originally intended by the editor or creator to be memorable to viewers. Another benefit of the techniques provided herein, according to some embodiments, is the improvement in accurately determining memorability by comparing the semantic meaning of a video feature to the semantic meaning of an accompanying text feature. In more detail, videos in which there is a high similarity between the semantic meanings of a video feature and the accompanying text are identified as having a higher memorability score, in some embodiments. Another benefit of the techniques provided herein, according to some embodiments, includes providing to video creators and editors recommendations for applying image styles (e.g., sharpen, blur, smooth, sepia tint, vintage tint) that, when selectively applied to content features, will improve memorability. Similar recommendations can be provided with respect to added features, such as text, graphics, and other additions.

Example of a User Interface for Memorability Analysis

Figure 6:
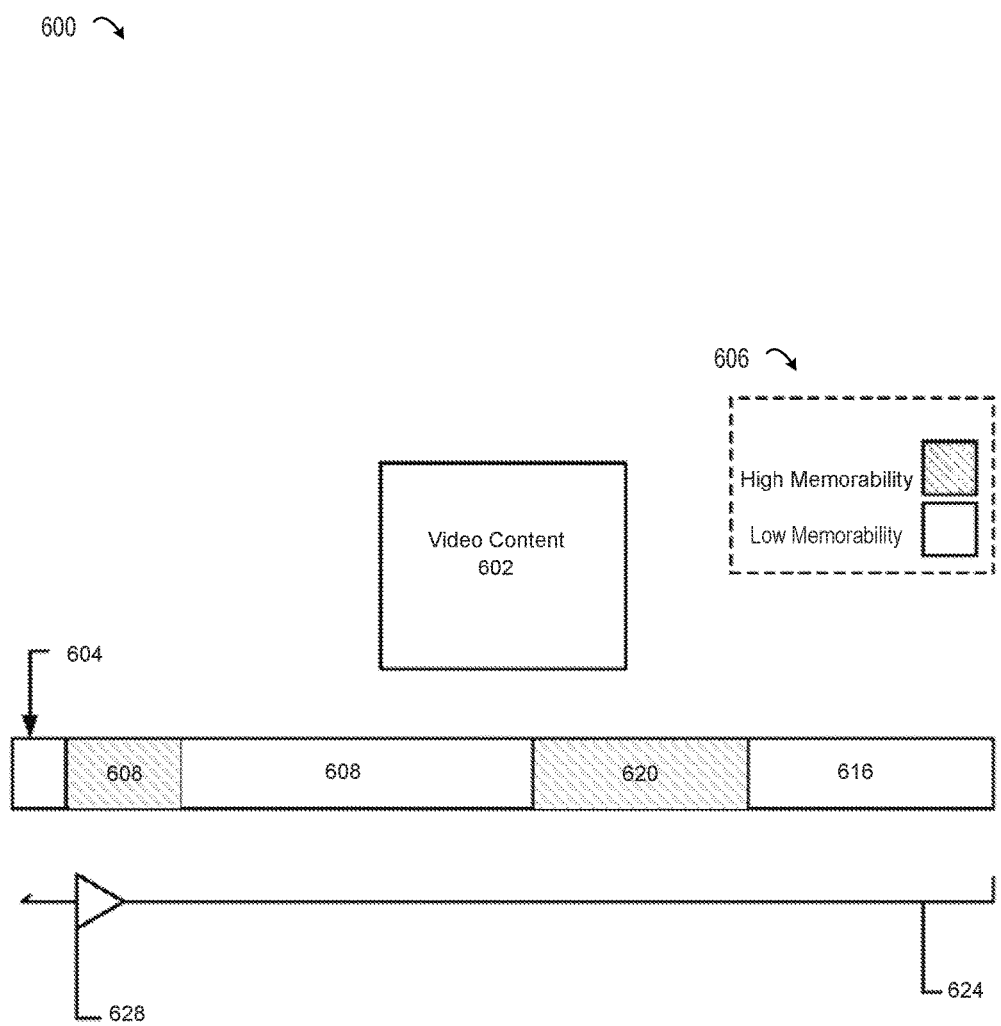
FIG. 6 is an example of a user interface configured for identifying content features having high and low memorability as a function of temporal location within a video, according to certain embodiments of this disclosure.

FIG. 6 depicts an example of a user interface 600 via which the memorability analysis subsystem 114 provides results of a memorability analysis. The user interface 610 includes a display of video content 602 being analyzed, a memorability map 604, a legend 606, and a video timeline 624. The video content 602 is optionally provided for display to the video creator or editor during analysis, thereby providing a convenient reference to the video feature identified in the memorability map 604 as either likely memorable or unlikely to be memorable.

The memorability map 604 is used in conjunction with the video timeline 624 to identify content features within the video content 602 that are likely to be memorable or unlikely to be memorable. Using this information, video editors and creators can understand, edit, and revise a video to enhance the memorability of the video. The memorability map 604 also provides an editor or creator with a reference by which to judge whether ideas and content features the editor or creator intended to be memorable actually have been found to be memorable.

The memorability map 604 includes highlighted areas 608 and 616, which have visual indicators indicating that these video portions are as unlikely to be memorable, and highlighted areas 612 and 620, which have visual indicators indicating that these video portions are as likely to be memorable. The shading used to identify these different regions is defined in legend 606. In some embodiments, the memorability analysis subsystem 114 determines, based on upper and lower thresholds of video memorability scores, whether to identify an area on the memorability map 604 as corresponding to either memorable or unlikely to be memorable content features. Examples of these thresholds include user-specified thresholds and thresholds determined based on an automated analysis of memorability scores of video content analyzed by the memorability analysis subsystem 114.

As the video content 602 is played, a location indicator 628 progresses over the timeline 624. With reference to the memorability map 604, the video content 602, the timeline 624 and the location indicator 628 on the timeline 624, a viewer is able to conveniently identify the content features identified by highlighting in the memorability map 604 as either likely or unlikely to be memorable. In some embodiments, one or more image styles may also be presented in the user interface 600. In one example, content features in an area 612 identified as more likely to be memorable in the memorability map 604 are presented in the user interface 600 in one or more frames, each of which has an image style applied to it to improve memorability. The viewer may then select which image style to apply to the one or more frames.

Examples of Devices in a Playback System

Figure 7:
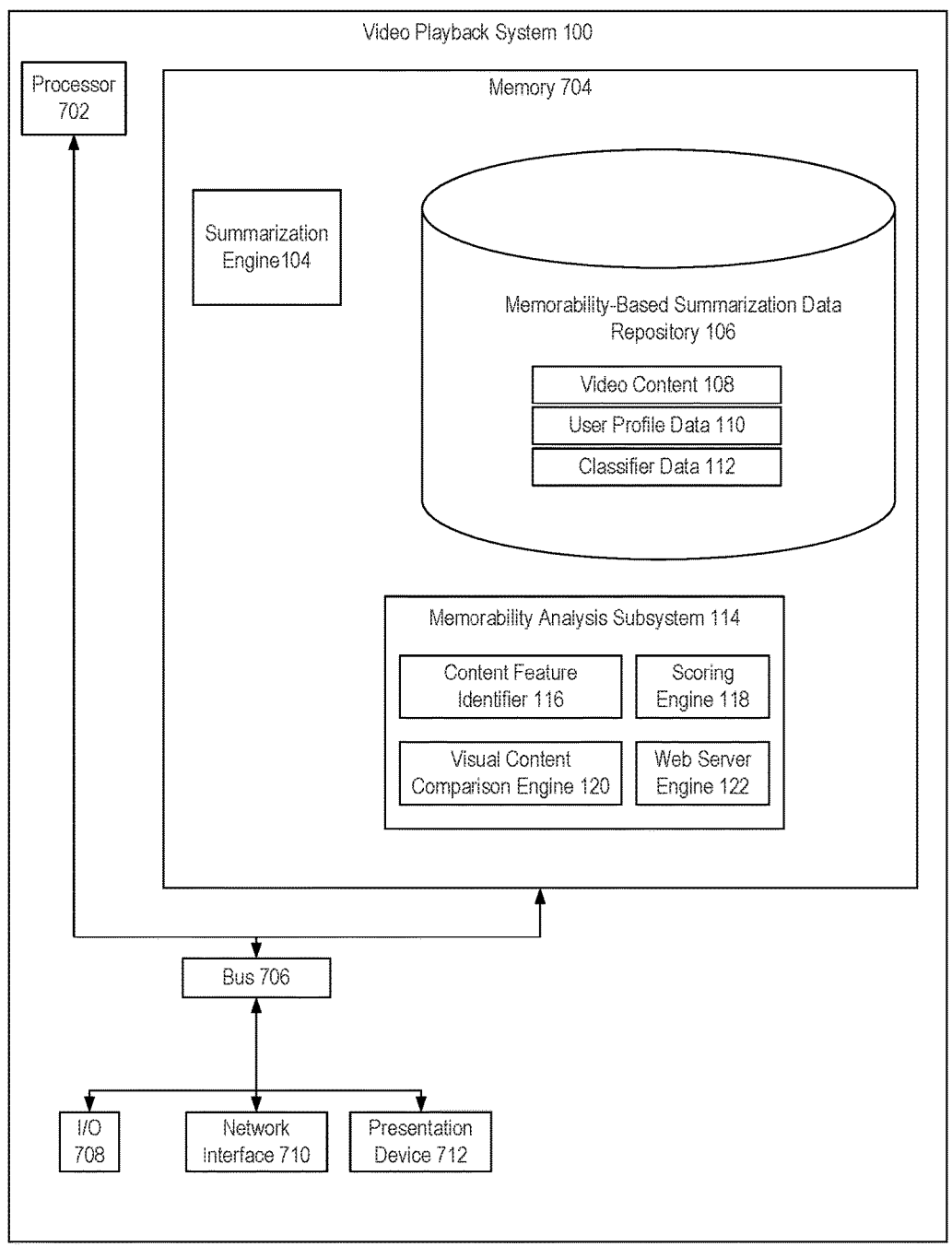
FIG. 7 is a block diagram depicting an example of a video summarization system, according to certain embodiments of this disclosure of the present disclosure.

Any suitable computing system or group of computing systems can be used for performing the operations described herein. For example, FIG. 7 depicts an example of a video summarization system 102. In some embodiments, the video summarization system 102 includes a processing device that executes the summarization engine 104, a memory that stores the memorability-based summarization data repository 106, and a presentation device 712 that plays video content, as depicted in FIG. 7. In other embodiments, separate computing systems having devices similar to those depicted in FIG. 7 (e.g., a processor, a memory, etc.) executes the summarization engine 104.

The depicted examples of a video summarization system 102 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The video summarization system 102 may also include a number of external or internal devices, such as input or output devices. For example, the video summarization system 102 is shown with one or more input/output ("I/O") interfaces 708. An I/O interface 708 can receive input from input devices or provide output to output devices. One or more buses 706 are also included in the video summarization system 102. The bus 706 communicatively couples one or more components of a respective one of the video summarization system 102.

The video summarization system 102 executes program code that configures the processor 702 to perform one or more of the operations described herein. The program code includes, for example, the summarization engine 104, the memorability analysis subsystem 114, or other suitable applications that perform one or more operations described herein. The program code may be resident in the memory device 704 or any suitable computer-readable medium and may be executed by the processor 702 or any other suitable processor. In some embodiments, both the summarization engine 104 and the memorability analysis subsystem 114 are stored in the memory device 704, as depicted in FIG. 7. In additional or alternative embodiments, one or more of the summarization engine 104 and the memorability analysis subsystem 114 are stored in different memory devices of different computing systems. In additional or alternative embodiments, the program code described above is stored in one or more other memory devices accessible via a data network.

The video summarization system 102 can access the video content 108 and other suitable data in any suitable manner. In some embodiments, one or more of these data sets and engines are stored in the same memory device (e.g., one or more memory devices 704), as in the example depicted in FIG. 7. In additional or alternative embodiments, one or more of the data sets and engines described herein are stored in one or more other memory devices accessible via a data network. For example, a video summarization system 102 that executes the memorability analysis subsystem 114 to generate memorability data can provide access to memorability data by external systems that execute the summarization engine 104. Furthermore, video content 108 that is associated with memorability data can be stored in the same memory device or stored in a remote memory device from an independent video content system.

In some embodiments, the video summarization system 102 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The video summarization system 102 is able to communicate with one or more other computing devices (e.g., a computing device executing a summarization engine 104) via a data network using the network interface device 710.

In some embodiments, the video summarization system 102 also includes the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the video summarization system 102 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for summarizing video content based on memorability of the video content, the method performed by one or more processing devices and comprising:
   accessing segments of an input video;
   computing memorability scores for the segments, respectively, wherein computing a memorability score for a segment comprises:
      generating (i) a semantic feature computed from an auto-captioning operation applied to the segment and (ii) a visual feature computed from one or more of a saliency analysis operation applied to the segment, a color analysis operation applied to the segment, and a spatio-temporal analysis operation applied to the segment,
      computing a first component score by applying a first predictor to the semantic feature, where the first predictor is trained to determine first component memorability scores by comparing user-generated memorability values with training semantic features generated by the auto-captioning operation,
      computing a second component score by applying a second predictor to the semantic feature, where the second predictor is trained to determine second component memorability scores by comparing the user-generated memorability values with training visual features generated by the one or more of the saliency analysis operation, the color analysis operation, and the spatio-temporal analysis operation, and
      computing the memorability score from an averaging operation applied to the first component score and the second component score;
   selecting a subset of segments from the segments based on each computed memorability score in the subset having a threshold memorability score; and
   generating visual summary content from the subset of the segments.

2. The method of claim 1, further comprising partitioning the input video into the segments prior to accessing the input video.

3. The method of claim 1, wherein selecting the subset of the segments based on each computed memorability score in the subset having the threshold memorability score comprises:
   ranking the segments according to the computed memorability scores, wherein the ranking applies a first rank to a first segment and a second rank to a second segment;
   determining that the first rank is greater than the second rank;
   including the first segment in the subset of the segments; and
   excluding the second segment from the subset of the segments.

4. The method of claim 1, wherein generating the visual summary content comprises:
   identifying a summary length for the visual summary content;
   selecting, from the subset of segments, a summary subset of segments having a combined length that is less than or equal to the summary length, wherein the summary subset includes a smaller number of segments than the subset of segments.

5. The method of claim 4, wherein selecting the summary subset comprises:
   determining that the summary subset (i) is less than or equal to the summary length and (ii) maximizes a sum of criteria scores for respective segments in the summary subset, wherein a criteria score comprises a memorability score for a segment weighted by a memorability weight and an additional video metric weighted by an additional video metric weight, wherein the additional video metric comprises one or more of video uniformity and video representativeness; and
   selecting the summary subset based on determining that the summary subset maximizes the sum of criteria scores and is less than or equal to the summary length.

6. The method of claim 1, wherein generating the visual summary content comprises combining the subset of the segments into a preview video that is included in the visual summary content.

7. The method of claim 1, wherein the visual summary content comprises a set of thumbnail images, wherein generating the set of thumbnail images comprises:
   computing visual quality scores for the subset of the segments;
   extracting thumbnail images from the subset of the segments based on the visual quality scores; and
   selecting the extracted thumbnail images as the set of thumbnail images.

8. A system comprising:
   a processing device; and
   a non-transitory computer-readable medium communicatively coupled to the processing device, wherein the processing device is configured to execute program stored in the non-transitory computer-readable medium and thereby perform operations comprising:
      identifying a summary length for a visual summary content to be generated using input video segments;
      determining that a summary subset of the input video segments (i) has a combined length that is less than or equal to the summary length and (ii) maximizes a sum of criteria scores for respective segments in the summary subset, wherein at least one criteria score comprises a memorability score for an input video segment weighted by a memorability weight and an additional video metric weighted by an additional video metric weight, wherein the additional video metric comprises one or more of video uniformity and video representativeness,
      selecting the summary-a subset of the input video segments based on determining that the summary subset maximizes the sum of criteria scores and is less than or equal to the summary length, and
      generating the visual summary content from the summary subset of the input video segments.

9. The system of claim 8, the operations further comprising selecting the summary subset of the input video segments based on each memorability score in the summary subset having a threshold memorability score.

10. The system of claim 9, wherein selecting the summary subset of the input video segments based on each memorability score in the summary subset having the threshold memorability score comprises:
ranking the input video segments according to the memorability scores, wherein the ranking applies a first rank to a first segment and a second rank to a second segment;
determining that the first rank is greater than the second rank;
including the first segment in the summary subset of the input video segments; and
excluding the second segment from the summary subset of the input video segments.

11. The system of claim 8, wherein generating the visual summary content comprises combining the summary subset of the input video segments into a preview video that is included in the visual summary content.

12. A non-transitory computer-readable medium having program code that is stored thereon, the program code executable by one or more processing devices for performing operations comprising:
accessing segments of an input video;
computing memorability scores for the segments, respectively, wherein computing a memorability score for a segment comprises:
generating (i) a semantic feature computed from an auto-captioning operation applied to the segment and (ii) a visual feature computed from one or more of a saliency analysis operation applied to the segment, a color analysis operation applied to the segment, and a spatio-temporal analysis operation applied to the segment,
computing a first component score by applying a first predictor to the semantic feature, where the first predictor is trained to determine first component memorability scores by comparing user-generated memorability values with training semantic features generated by the auto-captioning operation,
computing a second component score by applying a second predictor to the semantic feature, where the second predictor is trained to determine second component memorability scores by comparing the user-generated memorability values with training visual features generated by the one or more of the saliency analysis operation, the color analysis operation, and the spatio-temporal analysis operation, and
computing the memorability score from an averaging operation applied to the first component score and the second component score;
a step for selecting a subset of segments from the segments based on each computed memorability score in the subset having a threshold memorability score; and
generating visual summary content from the subset of the segments.

13. The non-transitory computer-readable medium of claim 12, the operations further comprising partitioning the input video into the segments prior to accessing the input video.

14. The non-transitory computer-readable medium of claim 12, wherein selecting the subset of the segments based on each computed memorability score in the subset having the threshold memorability score comprises:
ranking the segments according to the computed memorability scores, wherein the ranking applies a first rank to a first segment and a second rank to a second segment;
determining that the first rank is greater than the second rank;
including the first segment in the subset of the segments; and
excluding the second segment from the subset of the segments.

15. The non-transitory computer-readable medium of claim 12, wherein generating the visual summary content comprises:
identifying a summary length for the visual summary content;
selecting, from the subset of segments, a summary subset of segments having a combined length that is less than or equal to the summary length, wherein the summary subset includes a smaller number of segments than the subset of segments.

16. The non-transitory computer-readable medium of claim 15, wherein selecting the summary subset comprises:
determining that the summary subset (i) is less than or equal to the summary length and (ii) maximizes a sum of criteria scores for respective segments in the summary subset, wherein a criteria score comprises a memorability score for a segment weighted by a memorability weight and an additional video metric weighted by an additional video metric weight, wherein the additional video metric comprises one or more of video uniformity and video representativeness;
selecting the summary subset based on determining that the summary subset maximizes the sum of criteria scores and is less than or equal to the summary length.

17. The non-transitory computer-readable medium of claim 12, wherein the visual summary content comprises a set of thumbnail images, wherein generating the set of thumbnail images comprises:
computing visual quality scores for the subset of the segments;
extracting thumbnail images from the subset of the segments based on the visual quality scores; and
selecting the extracted thumbnail images as the set of thumbnail images.

* * * * *